(12) United States Patent
Lee

(10) Patent No.: US 8,099,775 B2
(45) Date of Patent: Jan. 17, 2012

(54) VIRTUAL FIREWALL SYSTEM BASED ON COMMONS SECURITY POLICY AND METHOD OF CONTROLLING THE SAME

(75) Inventor: Young-Seop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 12/218,176

(22) Filed: Jul. 11, 2008

(65) Prior Publication Data

US 2009/0019518 A1   Jan. 15, 2009

(30) Foreign Application Priority Data

Jul. 12, 2007   (KR) .................... 10-2007-0070158

(51) Int. Cl.
*G06F 15/16* (2006.01)
(52) U.S. Cl. ................. 726/11; 726/1; 726/14
(58) Field of Classification Search ........... 726/1, 11, 726/13, 14, 15; 709/224; 713/153–154
See application file for complete search history.

(56) References Cited

U.S. PATENT DOCUMENTS

| | | | |
|---|---|---|---|
| 6,330,562 B1* | 12/2001 | Boden et al. | 713/167 |
| 7,093,280 B2* | 8/2006 | Ke et al. | 726/3 |
| 2003/0041266 A1* | 2/2003 | Ke et al. | 713/201 |
| 2003/0145228 A1* | 7/2003 | Suuronen et al. | 713/201 |
| 2004/0083295 A1* | 4/2004 | Amara et al. | 709/229 |
| 2004/0249958 A1* | 12/2004 | Ozdemir et al. | 709/229 |
| 2005/0273848 A1* | 12/2005 | Charles et al. | 726/11 |
| 2006/0282887 A1* | 12/2006 | Trumper et al. | 726/11 |
| 2008/0163357 A1* | 7/2008 | Xiao | 726/15 |

* cited by examiner

*Primary Examiner* — Samson Lemma

(57) ABSTRACT

A virtual firewall system based on a common security policy and a method of controlling the same. The virtual firewall system includes one or more virtual security policy modules, each of which includes a local security policy database; a security policy determiner, which determines, from the one or more virtual security policy modules, a virtual security policy module corresponding to a packet received from outside; and a common security policy database, which stores security policies. Each of the one or more virtual security policy modules determines whether or not to apply a security policy of the common security policy database to the received packet, and when the security policy of the common security policy database is applied, does not apply the security policy of a local security policy database. An operator can easily and conveniently set and restore the system.

10 Claims, 6 Drawing Sheets

VIRTUAL FIREWALL SYSTEM BASED ON COMMONS SECURITY POLICY AND METHOD OF CONTROLLING THE SAME

CROSS-REFERENCE TO RELATED APPLICATION(S) AND CLAIM OF PRIORITY

The present application makes reference to and claims all benefits accruing under 35 U.S.C. §119 from an application for "VIRTUAL FIREWALL SYSTEM BASED ON COMMONS SECURITY POLICY AND METHOD OF CONTROLLING THE SAME" earlier filed in the Korean Intellectual Property Office on Jul. 12, 2007 and there duly assigned Serial No. 2007-0070158.

TECHNICAL FIELD OF THE INVENTION

The present invention relates to a virtual firewall system based on a common security policy and a method of controlling the same.

BACKGROUND OF THE INVENTION

A virtual firewall system is a new firewall system that improves the security functions of a system, which supports Internet protocol version 4 (IPv4) and Internet protocol version 6 (IPv6), by enlarging a virtual firewall to protocols.

Security applications capable of supporting a dual stack, which uses both IPv4 and IPv6 at the same time, are gradually increasing.

In general, the virtual firewall system is suitable for security application environments that simultaneously use a firewall, a tunneling protocol (e.g., IPSec, L2TP, PPTP, GRE and IPinIP) and so forth.

The concept of the virtual firewall has been previously introduced in some commercial firewall systems. The virtual firewall can be used in one system, divided into several firewall environments, and has functions similar to those of a virtual router used in a routing protocol.

Even though the original concept of the virtual firewall is flexible, the policy defined by each firewall may confuse users.

Complexity may also be increased in the case of attempting to add a function, such as a tunneling protocol, which is complicated and is not directly related with a virtual firewall.

In many cases, a user has no choice but to use the virtual firewall in order to support other complicatedly-entangled tunneling protocols in actual environments.

According to the security technologies of the prior art as described above, a conventional firewall and a tunneling protocol can be separated from each other to operate as independent modules. Alternatively, the functions of the conventional firewall and the tunneling protocol can be processed in one virtual firewall, which is defined according to features, so that a plurality of virtual firewalls can be set according to necessary applications.

In the security technologies of the prior art, however, the conventional firewall is of a concept separated from the tunnel protocol, in which the firewall is processed, the tunneling process is performed by calling the tunneling protocol, and then the firewall is processed again in order to efficiently process the tunneling protocol.

The conventional firewall does not have information on the tunneling, and thus has to call a tunneling protocol module in order to determine whether or not tunneling is necessary for respective packets, thereby degrading the performance thereof.

Due to this problem, there was proposed an approach of processing firewall and tunneling protocol functions as shown in FIG. 1, in which a virtual firewall and a tunneling protocol exist in one module.

However, this approach of processing the firewall and tunneling protocol functions in one module requires unnecessary equipment settings to be performed for the tunneling protocol even if the virtual firewall is not necessary and to set all policies of the tunneling protocol to the virtual firewall. Further, when a change is required, the policies of the tunneling protocol of all the virtual firewalls also have to be changed.

SUMMARY OF THE INVENTION

To address the above-discussed deficiencies of the prior art, it is a primary object to provide a virtual firewall system based on a common security policy and a method of controlling the same, in which a user can flexibly apply a conventional firewall function and a virtual firewall function according to various environments.

According to an aspect of the invention, there is provided a virtual firewall system based on a common security policy. The virtual firewall system includes one or more virtual security policy modules, each of which includes a local security policy database; a security policy determiner, which determines, from the one or more virtual security policy modules, a virtual security policy module corresponding to a packet received from outside; and a common security policy database, which stores security policies. Each of the one or more virtual security policy modules determines whether or not to apply a security policy of the common security policy database to the received packet, and when the security policy of the common security policy database is applied, does not apply the security policy of a local security policy database.

Each of the one or more virtual security policy modules may route the received packet by applying a local security policy when the security policy of the common security policy database is not applied.

Each of the common security policy database and the local security policy database may include a firewall policy database and a tunneling policy database, to each of which Internet Protocol version 4 (IPv4) and Internet Protocol version 6 (IPv6) are applied.

According to an aspect of the invention, there is provided a control method of a virtual firewall based on a common security policy in a security system. The method includes determining, at a security policy determiner of a security system, a virtual security policy module corresponding to a packet from one or more virtual security policy modules of the security system when the packet is received from outside; determining, at said corresponding virtual security policy module, whether or not to apply a security policy of a common security policy database to the received packet; and if the security policy of the common security policy database is applicable to the received packet, applying, at said corresponding virtual security policy module, the security policy of the common security policy database to the packet before routing the packet.

Here, the virtual security policy module routes the packet selectively and applies a firewall function and a tunneling function by a virtual firewall process and a virtual tunneling process.

The corresponding virtual security policy module determines whether or not to apply a security policy of a common security policy database to the received packet and applies a security policy of a local security policy database to the packet to route the packet if the security policy of the common security policy database is not applied.

Each of the common security policy database and the local security policy database may include a firewall policy database and a tunneling policy database, to each of which IPv4 and IPv6 are applied.

According to the virtual firewall system based on a common security policy and the method of controlling the same as set forth above, the virtual firewall can be omitted by setting the tunneling protocol to only the protocol-based virtual firewall, so as to compensate for a problem, which would occur from the virtual firewall supporting both the firewall function and the tunneling protocol function at the same time.

Furthermore, the firewall policy or the tunneling policy set to only the protocol-based virtual firewall is applicable to all virtual firewalls, so that an operator can easily and conveniently set and restore the system.

Moreover, since policies can be set commonly and locally, a conventional firewall scheme can be used and a user selectable function, which is more flexible than a conventional virtual firewall system, is also enabled.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged security technology. Hereinafter, a virtual firewall system based on a common security policy and a method controlling the same according to the invention will be described more fully with reference to the accompanying drawings, in which exemplary embodiments thereof are shown.

Figure 1:
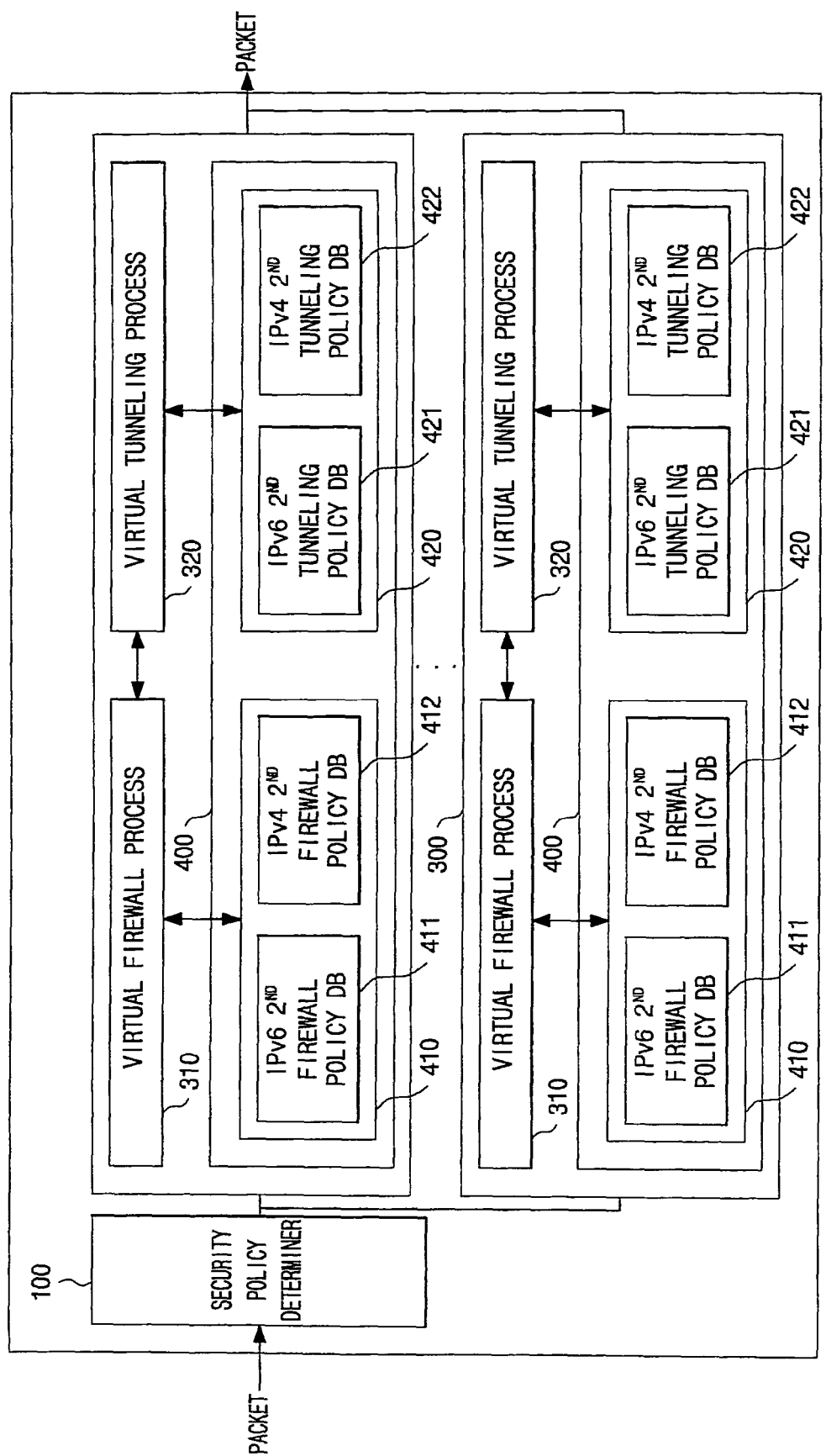
FIG. 1 is a block diagram illustrating the construction of a conventional virtual firewall system.
Figure 2:
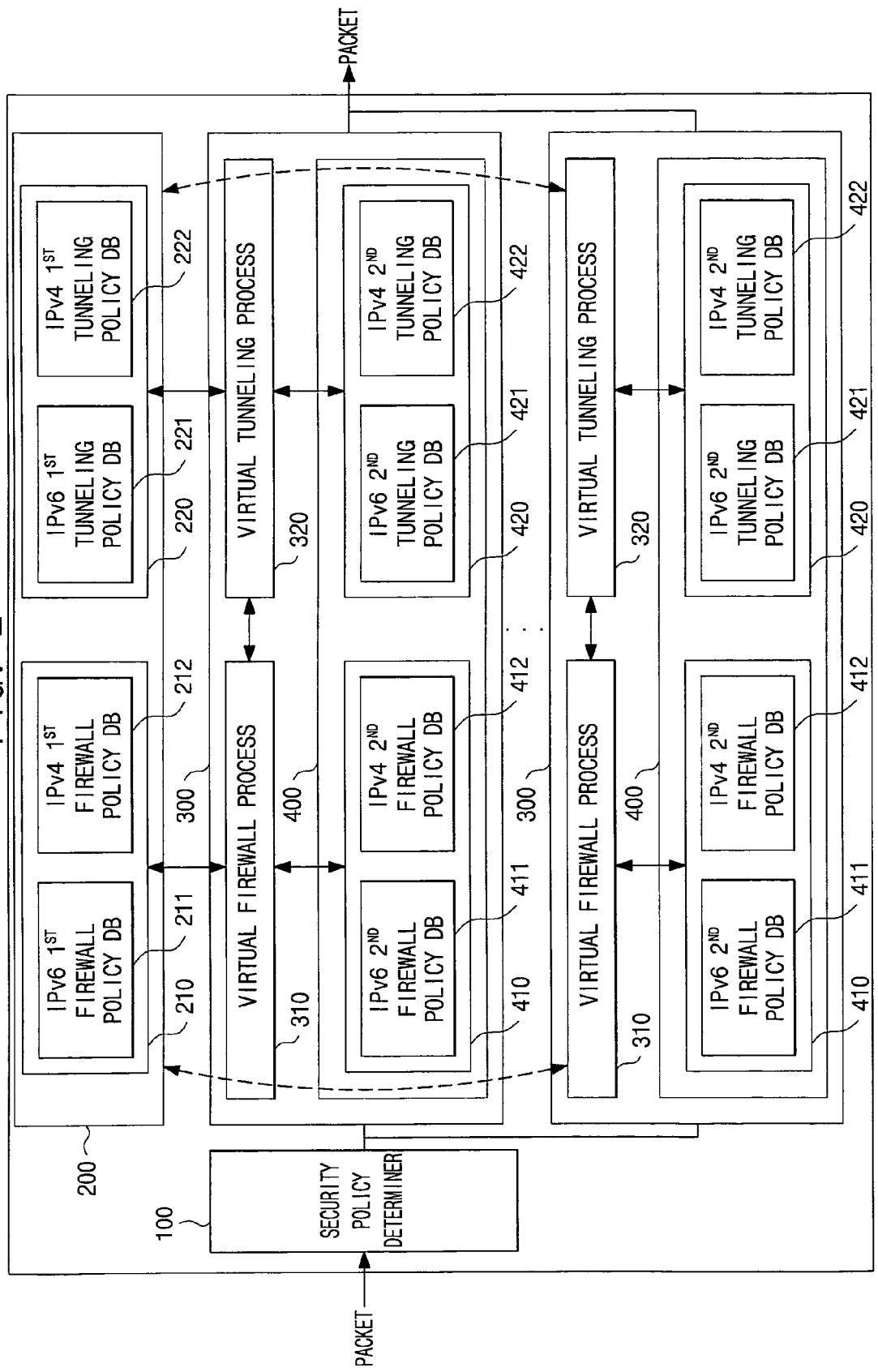
FIG. 2 is a block diagram illustrating the construction of a virtual firewall system based on a common security policy according to the invention.

FIG. 2 is a block diagram illustrating the construction of a virtual firewall system based on a common security policy according to the invention. Referring to FIG. 2, a virtual firewall system based on a common security policy of the invention includes a security policy determiner 100, a common security policy database (DB) 200 and one or more virtual security policy modules 300, each of which includes a local security policy DB 400. The common security policy DB 200 includes a first firewall policy DB 210 and a first tunneling policy DB 220. The first firewall policy DB 210 includes an IPv6 first firewall policy DB 211 and an IPv4 first firewall policy DB 212. The first tunneling policy DB 220 includes an IPv6 first tunneling policy DB 221 and an IPv4 first tunneling policy DB 222.

Each of the virtual security policy modules 300 also includes a virtual firewall process 310 and a virtual tunneling process 320.

The local security policy DB 400 of the virtual security policy module 300 includes a second firewall policy DB 410 and a second tunneling policy DB 420. The second firewall policy DB 410 includes an IPv6 second firewall policy DB 411 and an IPv4 second firewall policy DB 412, and the second tunneling policy DB 420 includes an IPv6 second tunneling policy DB 421 and an IPv4 second tunneling policy DB 422.

When a packet is received from outside, the security policy determiner 100 determines which one of the virtual security policy modules 300 corresponds to the received packet.

To this end, the security policy determiner 100 includes a table (not shown) including information on the virtual security policy modules.

The table contains information such as source and destination address information of packets, information on use of the common security policy DB and information matching the virtual security policy modules 300 to the source and destination address information of packets and the common security policy DB.

Thus, the security policy determiner 100 identifies a source IP address or a destination IP address of a received packet, and then selects a matching virtual security policy module 300.

Each of the one or more virtual security policy modules 300, including the local security policy DB 400, determines whether or not to apply a security policy of the common security policy DB 200 to a packet when the packet is received through the security policy determiner 100, and processes the packet by applying the local security policy to the same.

When the security policy of the common security policy DB 200 is applied to the packet, the virtual security policy module 300 routes the packet without applying a local security policy to the packet.

The virtual security policy module 300 includes a virtual firewall process 310 and a virtual tunneling process 320.

Below, a description will be given of those operations unique to the invention, but general functions and detailed operations of the foregoing components will not be described.

First, in the one or more security policy modules, the common security policy DB 200 stores security policies, and the common security policy DB 200 includes the first firewall policy DB 210 and the first tunneling policy DB 220.

The security policy determiner 100 has a table as seen in Table 1 below.

TABLE 1

|   | Source IP address | Destination IP address | Virtual security policy module | Common security policy DB |
|---|---|---|---|---|
| 1 | 169.100.100.001~169.100.100.099 | . | $1^{st}$ module | 0 |
| 2 | 169.100.100.100~169.100.100.199 | . | $2^{nd}$ module | 1 |
| ... | ... | . | ... | ... |
| n | . | 192.100.100.100~192.100.100.199 | $1^{st}$ module | 0 |

Here, the one or more virtual security policy modules 300 may apply tunneling information independently from a firewall.

Table 1 above is an example of a private network using private IP addresses, but can also use public IP addresses.

Hence, when a packet is received from outside, the security policy determiner 100 determines a corresponding virtual security policy module 300 for the packet from the virtual security policy modules 300.

If the security policy determiner 100 selects a corresponding one from the virtual security policy modules 300, the corresponding virtual security policy module 300 determines whether or not to apply a security policy of the common security policy DB 200 to the received packet, and then processes the packet by applying a local security policy to the same.

When the security policy of the common security policy DB is applied to the packet, the virtual security policy module 300 routes the packet without applying the local security policy to the same.

Figure 3:
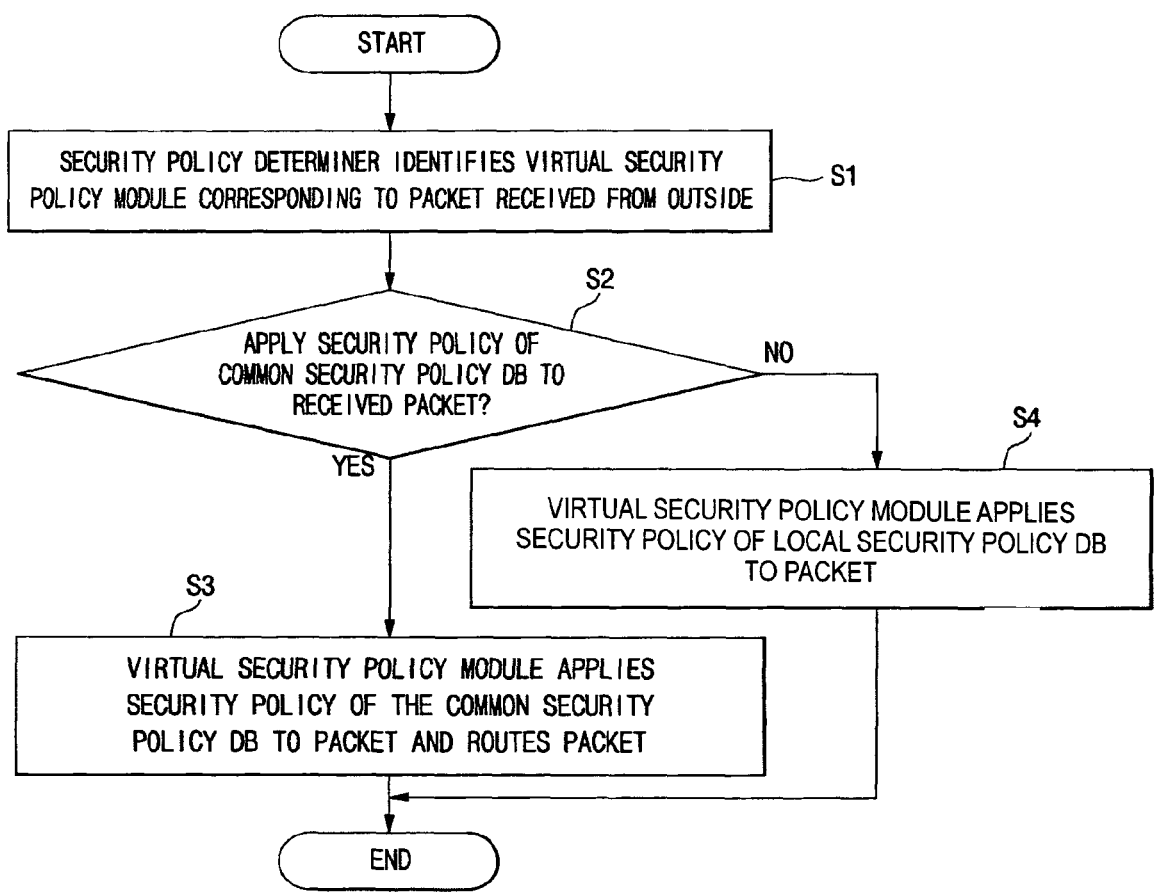
FIG. 3 is a flowchart illustrating a process of controlling a virtual firewall based on a common security policy according to the invention.

Now, with reference to FIG. 3, a description will be given of a method of controlling a virtual firewall based on a common security policy according to the invention in relation with the virtual firewall system, which has the above-described construction.

Firstly, when a packet is received from outside, the security policy determiner 100 of the security system determines a virtual security policy module 300 corresponding to the packet (S1).

Next, the corresponding virtual security policy module 300 determines whether or not to apply a security policy through of common security policy DB 200 to the received packet (S2).

As the result of the step S2 of determining whether or not to apply a security policy of the common security policy DB 200 to the received packet, if the security policy of the common security policy DB 200 is applicable to the received packet (Yes), the corresponding virtual security policy module 300 applies the security policy of the common security policy DB 200 to the received packet and then routes the packet (S3). The step S3 of routing the packet can selectively apply a firewall function and a tunneling function by the virtual firewall process 310 and the virtual tunneling process 320.

As the result of the step S2 of determining whether or not to apply a security policy of the common security policy DB 200 to the packet, if the security policy of the common security policy DB 200 is not applicable to the packet (No), the virtual security policy module 300 applies a security policy of the local security policy DB 400 (S4) to the packet.

Now, a description will be given of embodiments in which various firewall and tunneling protocol functions are provided in response to a user changing the setting of the common security policy DB 200 and the local security policy DB 400.

Figure 4:
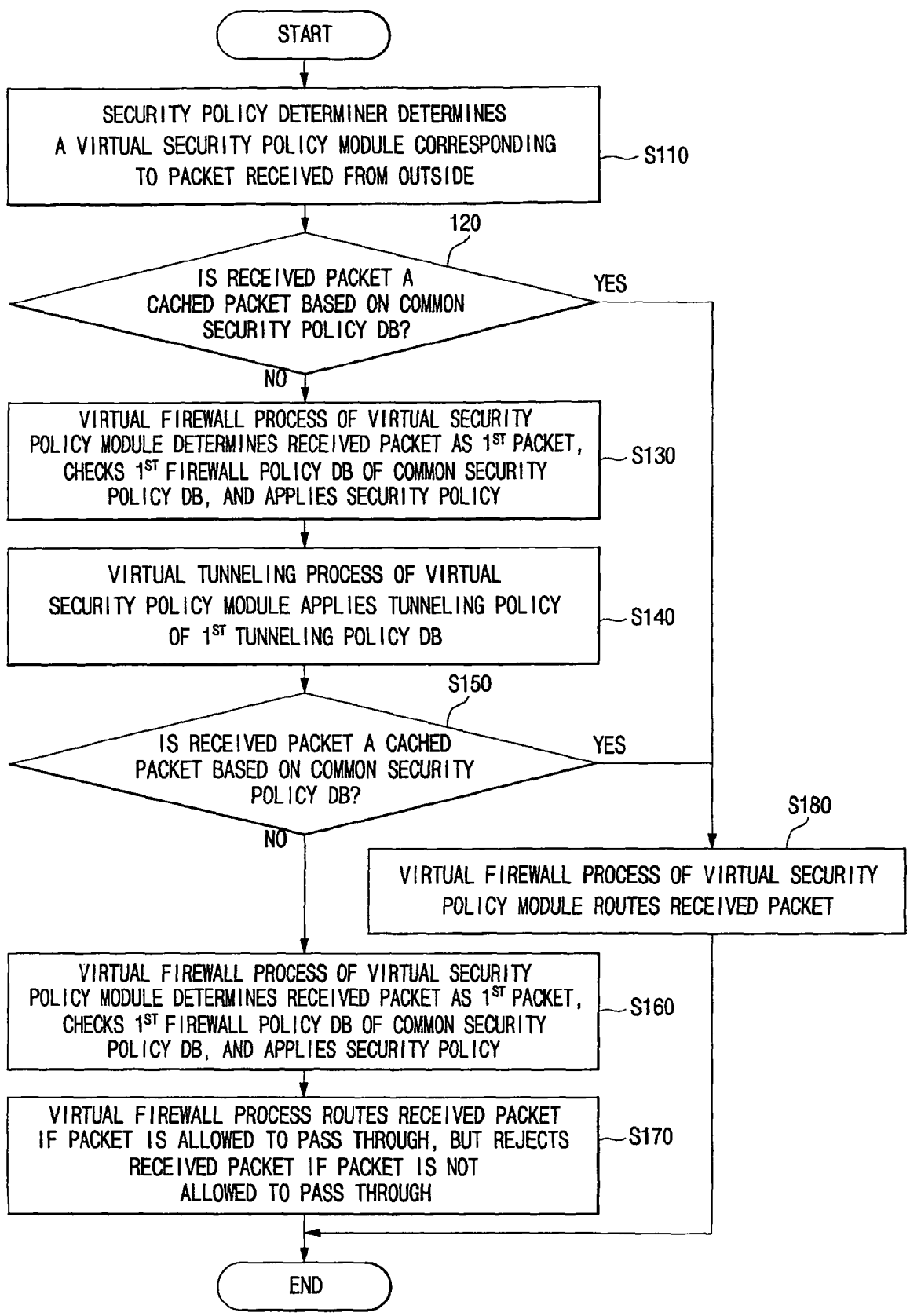
FIG. 4 is a flowchart illustrating the process of controlling a virtual firewall based on a common security policy according to the invention as shown in FIG. 3, in which only a common firewall function and a tunneling protocol are set but a virtual firewall function is absent.

Firstly, with reference to FIG. 4, a description will be given of a case in which only a general firewall function and a tunneling protocol are set but a virtual firewall function is absent.

When a packet is received, the security policy determiner 100 of the security system determines a virtual security policy module 300 corresponding to the received packet (S110). The corresponding virtual policy module 300 determines whether or not the received packet is a cached packet according to the common security policy DB 200 (S120).

If the received packet is not a cached packet according to the first firewall policy DB 210 of the common security DB 210 (No), the virtual firewall process 310 of the corresponding virtual security policy module 300 determines the received packet as a packet received for the first time (i.e., a first packet) and applies a security policy by checking the first firewall policy DB 210 of the common security policy DB 200 (S130).

The virtual tunneling process 320 of the virtual security policy module 300 applies a tunneling policy of the first tunneling policy DB 220 (S140).

The corresponding virtual security policy module 300 determines whether or not the packet is a cached packet according to the common security policy DB 200 (S150).

If the packet is not a cached packet according to the first firewall policy DB 210 of the common security policy DB 200 (No), the virtual firewall process 310 of the virtual security policy module 300 determines the packet to be a first packet and applies a security policy by checking the first firewall policy DB 210 of the common security policy DB 200 (S160).

Then, the virtual firewall process 310 determines whether or not to pass the packet according to the first firewall policy DB 210, and if the packet is allowed to pass through, acts to route the packet, but if the packet is not allowed to pass through, rejects the packet (S170).

If the received packet is a cached packet (Yes), the virtual firewall process 310 of the virtual security policy module 300 routes the received packet (S180).

The first firewall policy DB 210 can use the IPv6 first firewall policy DB 211 or the IPv4 first firewall DB 212.

Figure 5:
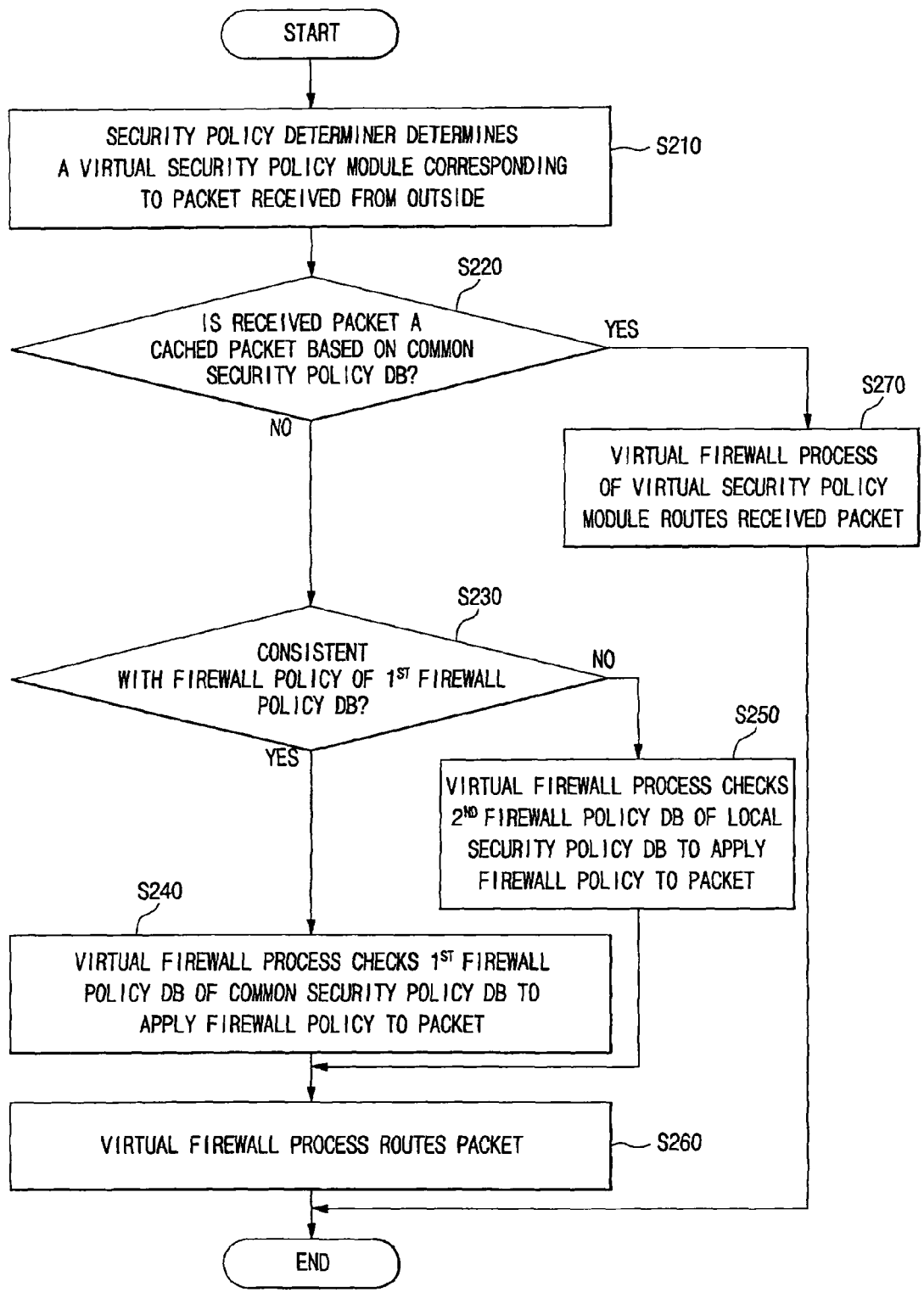
FIG. 5 is a flowchart illustrating the process of controlling a virtual firewall based on a common security policy according to the invention as shown in FIG. 3, in which only a virtual firewall function of the virtual firewall module is set.

Below, with reference to FIG. 5, a description will be given of a case in which only the firewall function of the virtual firewall module is set.

When a corresponding virtual security policy module 300 is determined by the security policy determiner 100 (S210), the virtual firewall process 310 of the corresponding virtual security policy module 300 determines whether or not a received packet is a cached packet (S220).

If the received packet is not a cached packet (No), the virtual firewall process 310 of the virtual security policy module 300 determines that the received packet is being received for the first time (i.e., a first packet), and determines whether or not the received packet is consistent with the firewall policy of the first firewall policy DB 210 of the common security policy DB 200 (S230).

If the received packet is consistent with the firewall policy of the first firewall policy DB 210 of the common security policy DB 200 (Yes), the virtual firewall process 310 of the virtual security policy module 300 checks the first firewall policy DB 210 of the common security policy DB 200 to apply the firewall policy to the packet (S240).

If the received packet is not consistent with the firewall policy of the first firewall policy DB 210 of the common security policy DB 200 (No), the virtual firewall process 310 of the virtual security policy module 300 checks the second firewall policy DB 410 of the local security policy DB 400 to apply the firewall policy to the packet (S250).

If the packet is allowed to pass through the application of the firewall policy of the second firewall policy DB 410 of the local security policy DB 400, the virtual firewall process 310 of the virtual security policy module 300 routes the packet (S260).

If the received packet is a cached packet (Yes), the virtual firewall process 310 of the virtual security policy module 300 routes the received packet (S270).

Figure 6:
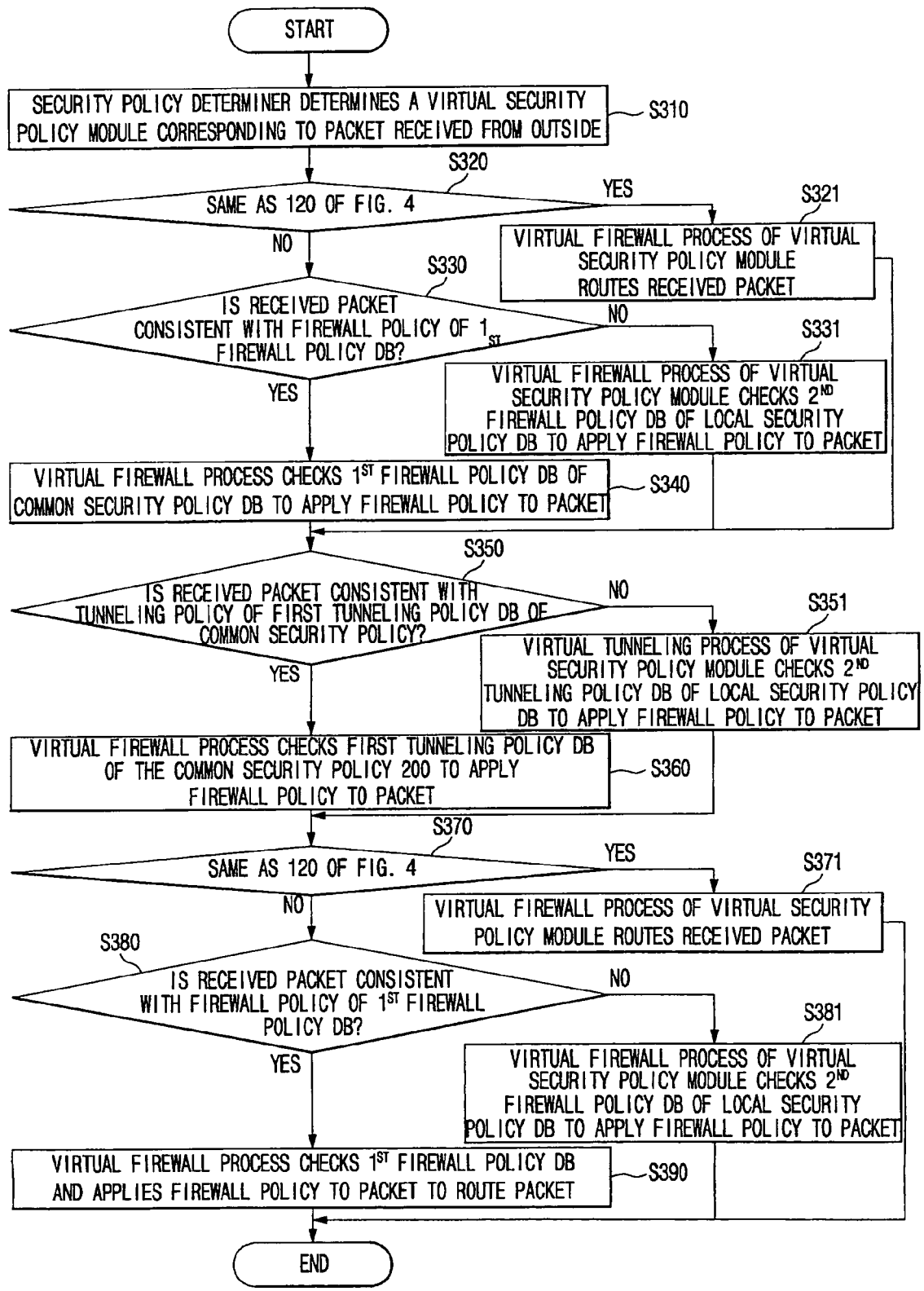
FIG. 6 is a flowchart illustrating the process of controlling a virtual firewall based on a common security policy according to the invention as shown in FIG. 3, in which both a tunneling protocol and a firewall function are set in the virtual firewall.

Next, with reference to FIG. 6, a description will be given of a case where both the tunneling protocol and the firewall function are set within the virtual firewall.

When a corresponding virtual security policy module 300 is determined by the security policy determiner 100 (S310), the virtual firewall process 310 of the corresponding virtual security policy module 300 determines whether or not a received packet is a cached packet (S320).

If the received packet is not a caching packet (No), the virtual firewall process 310 of the virtual security policy module 300 determines that the received packet is being received for the first time, and determines whether or not the received packet is consistent with the firewall policy of the first firewall policy DB 210 of the common security policy DB 200 (S330).

If the received packet is consistent with the firewall policy of the first firewall policy DB 210 of the common security policy DB 200 (Yes), the virtual firewall process 310 of the virtual security policy module 300 checks the first firewall policy DB 210 of the common security policy DB 200 to apply the firewall policy to the packet (S340).

Then, the virtual firewall process 310 of the virtual security policy module 300 determines whether or not the received packet is consistent with the tunneling policy of the first tunneling policy DB 220 of the common security policy DB 200 (S350).

If the received packet is consistent with the tunneling policy of the first tunneling policy DB 220 of the common security policy DB 200 (Yes), the virtual firewall process 310 checks the first tunneling policy DB 220 of the common security policy DB 200 to apply the firewall policy to the packet (S360).

The virtual firewall process 310 of the virtual security policy module 300 determines whether or not the received packet is a cached packet (S370).

If the received packet is not a cached packet (No), the virtual firewall process 310 of the virtual security policy module 300 determines that the received packet is being received for the first time, and determines whether or not the received packet is consistent with the firewall policy of the first firewall policy DB 210 of the common security policy DB 200 (S380).

If the received packet is consistent with the firewall policy of the first firewall policy DB 210 of the common security policy DB 200 (Yes), the virtual firewall process 310 of the virtual security policy module 300 checks the first firewall policy DB 210 of the common security policy DB 200 and applies the firewall policy to the packet to route the packet (S390).

If the received packet is not consistent with the firewall policy of the first firewall policy DB 210 of the common security policy DB 200 (No), the virtual firewall process 310 of the virtual security policy module 300 checks the second firewall policy DB 410 of the local security policy DB 400 to apply the firewall policy of the packet (S331).

If the received packet is not consistent with the tunneling policy of the first tunneling policy DB 220 of the common security policy DB 200 (No), the virtual tunneling process 320 of the virtual security policy module 300 checks the second tunneling policy DB 420 of the local security policy DB 400 to apply the tunneling policy to the packet (S351).

If the received packet is not consistent with the firewall policy of the first firewall policy DB 210 of the common security policy DB 200 (No), the virtual firewall process 310 of the virtual security policy module 300 checks the second firewall policy DB 410 of the local security policy DB 400 to apply the firewall policy to the packet (S381).

If the received packet is a cached packet (Yes), the virtual firewall process 310 of the virtual security policy module 300 routes the received packet (S321, S371).

Conversely, in the case of setting only the tunneling protocol without the firewall function, the common firewall and tunneling policies are set to only the common security policy DB 200, such that all packets pass through only the common security policy DB 200.

Accordingly, in the case of firewall processing, all packets are always allowed to pass through as the result of processing such that only the tunneling policy is processed.

In the meantime, if only the firewall function is set in the virtual firewall, a local firewall policy DB of a corresponding virtual firewall is applied to a received packet, and the firewall result is applied to the packet if the packet is cached. If the packet is not cached, the packet is regarded as a first packet. If it is determined that the packet is consistent with a security policy according to the common security policy DB 200, the corresponding security policy is applied to the packet. If there is no consistent policy, the local security policy DB 400 of the corresponding virtual firewall is applied to route the packet.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A virtual firewall system based on a common security policy, comprising:
a first storage device having one or more virtual security policy modules, each of which includes a local security policy database;
a processor having a security policy determiner, which selects, from the one or more virtual security policy modules, a virtual security policy module corresponding to a packet received from outside; and
a second storage device having a common security policy database, which stores one or more security policies,
wherein each of the one or more virtual security policy modules determines whether or not to apply a security policy to the received packet according to the common security policy database, and when the security policy is applied according to the common security policy database, bypasses a security policy of a local security policy database, and
wherein each of the common security policy database and the local security policy database includes a firewall policy database and a tunneling policy database.

2. The virtual firewall system according to claim 1, wherein the security policy determiner comprises a table including a source and a destination address information of packets, an information on use of the common security policy database and an information on the one or more virtual security policy modules, and identifies a source address information or a destination address information of the received packet to select the corresponding virtual security policy module from the one or more virtual security policy modules.

3. The virtual firewall system according to claim 1, wherein each of the one or more virtual security policy modules routes the received packet by applying a local security policy when the security policy is not applied through the common security policy database.

4. The virtual firewall system according to claim 1, wherein Internet protocol version 4 and Internet protocol version 6 are applied to each of the firewall policy database and the tunneling policy database of the common security policy database and the local security policy database.

5. A control method of a virtual firewall based on a common security policy in a security system, the method comprising:
selecting, at a security policy determiner of a processor of the security system, a virtual security policy module corresponding to a packet from one or more virtual security policy modules of the security system when the packet is received from outside;
determining, at said corresponding virtual security policy module, whether or not to apply a security policy of a common security policy database in a storage device of the security system to the received packet; and
if the security policy of the common security policy database is applicable to the received packet, applying, at said corresponding virtual security policy module, the security policy of the common security policy database to the packet before routing the packet;
wherein each of the one or more virtual security policy modules determines whether or not to apply a security policy to the received packet according to the common security policy database, and when the security policy is applied according to the common security policy database, bypasses a security policy of a local security policy database, and
wherein each of the common security policy database and the local security policy database includes a firewall policy database and a tunneling policy database.

6. The virtual firewall control method according to claim 5, wherein determining, at said security policy determiner of the security system, a virtual security policy module corresponding to a packet from one or more virtual security policy modules of the security system when the packet is received from outside comprises identifying a source address or a destination address of the received packet to select the corresponding virtual security policy module based on a predetermined table, which includes a source and a destination address information of the packet, an information on use of the common security policy database and an information on the one or more virtual security policy modules.

7. The virtual firewall control method according to claim 6, wherein determining, at said corresponding virtual security policy module, whether or not to apply a security policy of a common security policy database to the received packet comprises, if the security policy of the common security policy database is not applied, applying a security policy of a local security policy database to the packet to route the packet.

8. The virtual firewall control method according to claim 7, wherein the local security policy database includes a firewall policy database and a tunneling policy database.

9. The virtual firewall control method according to claim 8, wherein Internet protocol version 4 and Internet protocol version 6 are applied to each of the firewall policy database and the tunneling policy database of the common security policy database and the local security policy database.

10. The virtual firewall control method according to claim 5, further comprising:
selecting from one or more virtual security policy modules of the security system, a virtual security policy module corresponding to a packet received from outside;
determining if a security policy of a common security policy database is applicable to the received packet;
if the security policy of the common security policy database is applicable to the received packet, applying the security policy of the common security policy database to the packet before routing the packet; and
if the security policy of the common security policy database is not applicable, applying a security policy of a local security policy database to the packet to route the packet.

* * * * *